(12) United States Patent
Wang

(10) Patent No.: US 8,413,124 B2
(45) Date of Patent: Apr. 2, 2013

(54) SYSTEM AND METHOD FOR COMPILING AND MATCHING REGULAR EXPRESSIONS

(75) Inventor: Hao Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 472 days.

(21) Appl. No.: 12/696,421

(22) Filed: Jan. 29, 2010

(65) Prior Publication Data
US 2010/0131935 A1     May 27, 2010

Related U.S. Application Data

(63) Continuation of application No. PCT/CN2008/071811, filed on Jul. 30, 2008.

(30) Foreign Application Priority Data

Jul. 30, 2007    (CN) .......................... 2007 1 0075449

(51) Int. Cl.
*G06F 9/45*    (2006.01)
(52) U.S. Cl. .......................... 717/143; 717/140; 717/141
(58) Field of Classification Search .................. 717/141, 717/143, 140
See application file for complete search history.

(56) References Cited

U.S. PATENT DOCUMENTS

| | | | |
|---|---|---|---|
| 5,495,409 A * | 2/1996 | Kanno | 700/79 |
| 6,298,477 B1 | 10/2001 | Kessler | |
| 6,505,157 B1 * | 1/2003 | Elworthy | 704/257 |
| 7,180,895 B2 | 2/2007 | Smith | |
| 7,225,188 B1 | 5/2007 | Gai et al. | |
| 7,779,049 B1 * | 8/2010 | Phillips | 707/809 |
| 7,805,392 B1 * | 9/2010 | Steele et al. | 706/48 |
| 7,953,895 B1 * | 5/2011 | Narayanaswamy et al. | 709/250 |
| 8,024,802 B1 * | 9/2011 | Preston | 726/22 |
| 2004/0030776 A1 | 2/2004 | Cantrell et al. | |
| 2005/0005145 A1 * | 1/2005 | Teixeira | 713/193 |
| 2005/0114700 A1 * | 5/2005 | Barrie et al. | 713/201 |
| 2006/0242123 A1 | 10/2006 | Williams, Jr. | |
| 2007/0055664 A1 | 3/2007 | Michaeli et al. | |
| 2007/0195814 A1 * | 8/2007 | Barrie et al. | 370/463 |
| 2008/0013461 A1 * | 1/2008 | Garnero et al. | 370/252 |
| 2008/0071783 A1 * | 3/2008 | Langmead et al. | 707/6 |

FOREIGN PATENT DOCUMENTS

| | | |
|---|---|---|
| CN | 1255674 A | 6/2000 |
| JP | 2007-102744 A | 4/2007 |

OTHER PUBLICATIONS

Diehl et al. "Levels of Exploration", 2001 ACM, pp. 60-64.*
Baker et al., "Regular Expression Software Deceleration for Intrusion Detection Systems", 2006, IEEE.*
Abou-Assaleh et al., "Enhancing GNU grep", Apr. 27, 2004.*
Yu et al., "Fast and Memory-Efficient Regular Expression Matching for Deep Packet Inspection", May 22, 2006.*

(Continued)

*Primary Examiner* — Phillip H Nguyen
(74) *Attorney, Agent, or Firm* — Leydig, Voit & Mayer, Ltd.

(57) ABSTRACT

A system and method for compiling and matching regular expressions is disclosed. The regular expression compiling system includes a syntax analyzing module and at least two types of compiling modules. The syntax analyzing module is configured to analyze syntactic characteristics of a regular expression and send the regular expression to an appropriate compiling module according to preset syntactic rules and the syntactic characteristics of the regular expression; and the appropriate compiling module is configured to receive the regular expression and compile the regular expression into a data structure of a specific form.

8 Claims, 4 Drawing Sheets

OTHER PUBLICATIONS

Stubblebine, "Regular Expressions for Perl, C, PHP, Python, Java, and .NET", 2007.*

1$^{st}$ Office Action in corresponding Chinese Application No. 200710075449.4 (Sep. 30, 2010).

Extended European Search Report in corresponding European Application No. 08783804.1 (Dec. 13, 2010).

Written Opinion of the International Searching Authority in corresponding PCT Application No. PCT/CN2008/071811 (Sep. 18, 2008).

Aldwairi et al., "Configurable String Matching Hardware for Speeding up Intrusion Detection," Department of Electrical and Computer Engineering, North Carolina State University, Mar. 2005, vol. 33, No. 1, ACM SIGARCH Computer Architecture News, Raleigh, North Carolina.

Chayun, "Wouldn't it Be Nice?," Jan. 1, 2007, Version 1.1, PCRE—Perl Compatible Regular Expression Library, Haifux Linux Club, Haifi, Israel.

Kumar et al., "Algorithms to Accelerate Multiple Regular Expressions Matching for Deep Packet Inspection," Sep. 11-15, 2006, SIGCOMM'06, Pisa, Italy.

Piyachon et al., "Efficient Memory Utilization on Network Processors for Deep Packet Inspection," Department of Electrical and Computer Engineering, University of Massachusetts Lowell, Dec. 3-5, 2006, ANCS'06, San Jose, California.

Yu et al., "Fast and Memory-Efficient Regular Expression Matching for Deep Packet Inspection," Dec. 3-5, 2006, ANCS'06, San Jose, California.

* cited by examiner (a)

(b)

(a)

(b)

SYSTEM AND METHOD FOR COMPILING AND MATCHING REGULAR EXPRESSIONS

CROSS-REFERENCE TO RELATED APPLICATIONS

This application is a continuation of International Patent Application No. PCT/CN2008/071811, filed Jul. 30, 2008, which claims priority to Chinese Patent Application No. 200710075449.4, filed Jul. 30, 2007, both of which are hereby incorporated by reference in their entireties.

FIELD OF THE INVENTION

The present invention relates to communications, and in particular, to a system and method for compiling and matching regular expressions.

BACKGROUND OF THE INVENTION

With the emergence of All-IP, Fixed and Mobile Convergence (FMC) and Triple-play concepts, the traditional IP network is changing towards a uniform bearer network for all services including data, voice and video.

However, the inherent data transfer mode and open nature of IP networks do not meet the needs of carrier-class services well. Improvements are yet to be made in network security, manageability and assurance of Quality of Service (QoS) and Quality of Experience (QoE) for key services. For precise identification and control of certain key services, in addition to the traditional analysis of the quintuplet field in the packet header, it is also necessary to inspect the packet load. For example, some Peer-to-Peer (P2P) traffic uses unknown ports and it will be impossible to identify the traffic class by merely analyzing the quintuplet. Deep Packet Inspection (DPI) is a flexible and effective service identification technology and is widely applied to firewalls, Intrusion Detection Systems/Intrusion Prevention Systems (IDSs/IPSs), and service control gateways to implement application layer load balancing and feature-based security filtering. Unlike previous packet inspection, DPI not only analyzes protocols below layer 4 (IP layer) in the TCP/IP model but also inspects information above layer 4. Therefore, DPI provides richer information but the processing is also more complex.

A traditional DPI system compares the packet load with a preset set of character strings to judge whether the packet meets the specific features. In recent years, more and more systems are using regular expressions to replace character strings for description of packet features. Compared with character strings, regular expressions can describe features flexibly, easily and effectively so that a feature string is dynamic and adaptable to various dynamic searches. For example, features described by character strings b, ab, aab, aaab, and aaaab can be expressed with one simple regular expression a*b. Different regular expression language specifications have different descriptive capabilities. Popular regular expression specifications in the industry include Portable Operating System Interface (POSIX) and Perl Compatible Regular Expression (PCRE). PCRE includes some extensions that POSIX does not support and therefore its descriptive capability is more powerful. For example, Snort uses PCRE to describe some of its rules. At present, POSIX is used by most devices. Some devices are claimed to support PCRE but their product information proves they support only a PCRE subset that is compatible with POSIX. They do not support the complex PCRE syntaxes in a real sense.

The action to check whether the packet content contains rules described by regular expressions is called regular expression matching. The following describes some popular regular expression matching methods.

One method is based on a Deterministic Finite Automaton (DFA), where regular expressions are converted in advance into transition tables described in a certain form. During a matching process, symbols in a packet are used as an input condition for querying the transition table so as to determine the next transition state. The merit of this method is the easy "table query-transition" operation mode, which is convenient to implement by hardware and the matching is quick. The weakness of this method is the support for only simple regular expression specifications, and many extensions in PCRE, including condition expressions, ^, $ and other location related symbols, and matching options, are not well supported. In addition, when some regular expressions such as, *AB.{j} CD are expressed in the DFA, the number of their states will increase exponentially with the length of the regular expressions, which imposes a great pressure on storage.

Another method is based on a Non-deterministic Finite Automaton (NFA). The basic principle thereof is similar to that of a DFA and the difference is that the NFA allows empty symbols (it supports transition when no symbol is inputted) and the input of one symbol in the NFA may activate multiple next transition states. Such non-deterministic nature causes difficulty in implementation by hardware. There are some methods for implementing the NFA by hardware but the NFA transition tables are directly implemented by programmed logical devices. In this case, when the regular expressions are updated, the programmed logical devices need to be updated so that the scalability is poor.

A third method is program parsing. This method normally does not generate transition tables. Taking the PCRE source code library as an example, regular expressions are parsed into minimum segments understandable to a program. In a matching process, the program places symbols in a packet into different segments according to their locations. If a symbol matches one segment, the program waits for the next symbol in the segment or enters the next segment. Some software solutions may adopt other processing modes but can still be categorized into program parsing. This method normally has good scalability and supports complex regular expression syntaxes. But, in comparison with a state machine, its matching speed is lower so that it is liable to become a bottleneck of the entire system.

A multi-layer packet filtering architecture is provided in a first embodiment of the conventional art, where different filtering standards may be defined for filters at different layers. Packets after layer-1 filtering are sent to the layer-2 filter and so on until a filtering result is concluded. The first embodiment of the conventional art is applicable to scenarios where different layers adopt different filtering standards and normally packets are filtered by a preceding layer to reduce the data processing of the subsequent layer. Because the layers are in a strict sequence, to improve the total efficiency, filters of more complex processing should be placed more faraway. The first embodiment of the conventional art has the following weaknesses: because filters at different layers are in a restrict sequence, the flexibility is low and the delay in packet processing will be longer; for example, some packets do not need layer 1 filtering at all, but according to the multilayer filtering architecture, these packets need to pass through the layer 1 filter before entering the layer 2 filter for matching, which on the one hand, wastes the processing capability of the layer 1 filter and on the other hand, prolongs the time for packet matching. The first embodiment of the conventional art gives only general definitions of filtering standards without specifying a solution specific to regular expressions.

FIG. 1 shows a structure of a regular expression matching system where a Ternary Content Addressable Memory (TCAM) 304 is configured to store DFAs according to a second embodiment of the conventional art. A method for implementing regular expression matching by storing DFAs in TCAM according to the second embodiment of the conventional art includes:

1. A regular expression is divided into multiple sub-expressions by using meta characters (like .*) in the regular expression and store the regular expression in the TCAM 304 (in fact the DFA transition table is stored). The TCAM 304 is able to compare features of multiple characters at a time and work as a state machine with multiple steps.

2. Packet processing actions are stored in a second memory structure 320 which may be a Random Access Memory (RAM).

3. A pre-parser, the front-end analyzing program 334 in the figure, extracts fields to process from a packet cache 258 and stores the fields in a message cache 306.

4. The message cache 306 is configured to store packet messages that need regular expression matching.

5. A decoding circuit 302 decodes the packets and executes commands related to the packets.

6. Under control of the decoding circuit 302, a barrel shifter 308 extracts the different part from the packets and sends it together with the current state stored in a tag space 318 to the TCAM 304 for comparison.

7. Once the TCAM 304 inspects a regular expression, the corresponding action stored in the second memory structure 302 will be executed by the decoding circuit, which generates a signal and sends the signal to a traffic controller 352.

The second embodiment of the conventional art has the following weaknesses: the implementation of the technical solution under the second embodiment of the conventional art is closely related to the fact that the TCAM can simultaneously access multiple characters and therefore the solution is not universally applicable; the high price and high power consumption of the TCAM also limit its use; to reduce the number of sub-expressions so as to reduce occupied TCAM entries, multiple DFAs need to be combined into one DFA so that it is necessary to recompile the entire DFA once the regular expression is updated; the second embodiment of the conventional art does not provide good support for many extensions in PCRE.

In a third embodiment of the conventional art, a special regular expression inspection module is adopted in the inspection system. When it is necessary to inspect regular expressions, traffic is injected to the module for processing. The module uses Application Specific Integrated Circuit (ASIC) chips to implement the DFA and now supports POSIX regular expressions. The implementation details are unavailable business secrets. The third embodiment of the conventional art has these weaknesses: the third embodiment of the conventional art does not support PCRE regular expressions; according to analysis, if it is necessary to support PCRE regular expressions, the user needs to provide implementation outside the ASIC chip and no specific implementation solution is yet disclosed.

SUMMARY OF THE INVENTION

Embodiments of the present invention provide a system and method for compiling and matching regular expressions so as to resolve the issue in the conventional arts that a system does not consider characteristics of regular expressions but uses a DFA method to process all regular expressions and therefore cannot support PCRE in a real sense.

A regular expression compiling system includes a syntax analyzing module and at least two types of compiling modules. The syntax analyzing module is configured to analyze syntactic characteristics of a regular expression and send the regular expression to an appropriate compiling module according to preset syntactic rules and the syntactic characteristics of the regular expression. The appropriate compiling module is configured to receive the regular expression and compile the regular expression into a data structure of a specific form.

A regular expression matching system includes at least two types of matching modules configured to match a received data packet according to syntactic characteristics of regular expressions with which the data packet is checked, where matching methods include DFA matching and PCRE matching.

A regular expression compiling method includes: receiving a user-inputted regular expression rule which includes a regular expression and analyzing the syntax of the regular expression; and compiling the regular expression into a data structure of a specific form according to preset rules.

A regular expression matching method includes: receiving a data packet requiring matching from a front-end module; and matching the data packet appropriately according to syntactic characteristics of regular expressions the data packet matches.

The regular expression matching system and matching method in the embodiments of the present invention use multiple regular expression matching algorithms to assure not only a high processing speed of a regular expression matching engine but also compatibility with various extended syntaxes of regular expressions. The regular expression compiling system and compiling method in the embodiments of the present invention use compilers with a feedback mechanism and therefore are able to adjust the processing behaviors of the engine according to characteristics of real-time traffic and thus increase the system throughput.

The characteristics and merits of the present invention will be described in detail with reference to exemplary embodiments and accompanying drawings.

DETAILED DESCRIPTION OF THE INVENTION

For better understanding of the objective, technical solution and merits of the present invention, embodiments of the present invention are hereinafter described in detail with reference to the accompanying drawings.

Figure 1:
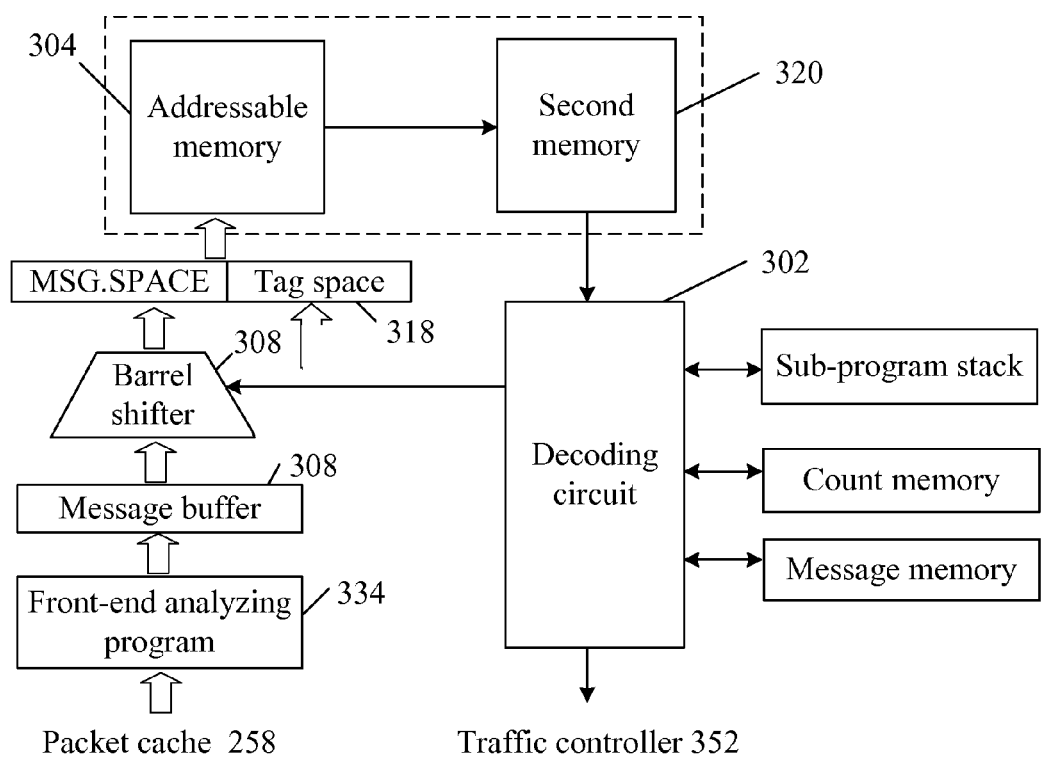
FIG. 1 shows a structure of a regular expression matching system where a TCAM stores DFAs according to the second embodiment of the conventional art.
Figure 2:
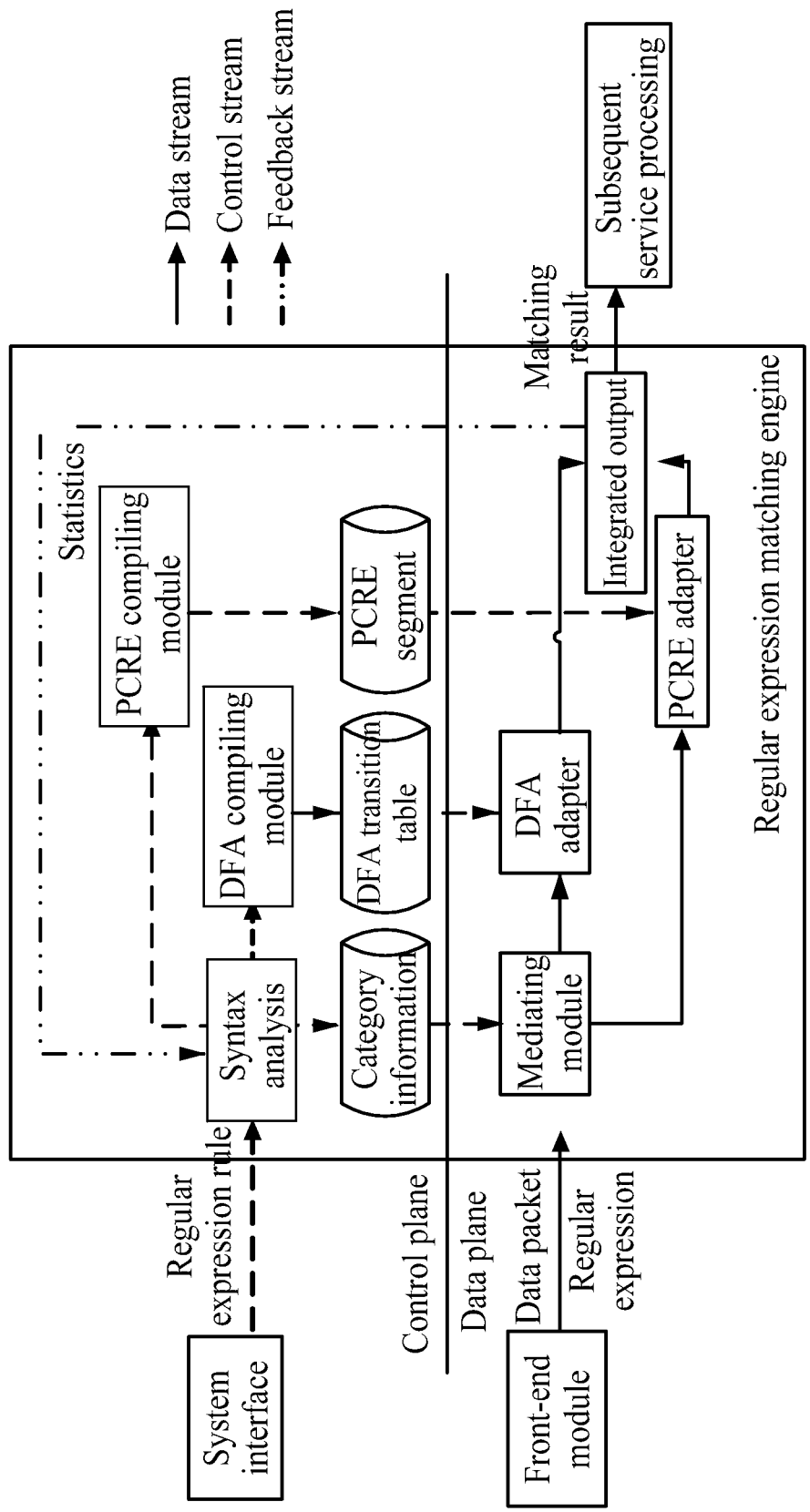
FIG. 2 shows a structure of a regular expression matching engine according to an embodiment of the present invention.

FIG. 2 shows a structure of a regular expression matching engine according to an embodiment of the present invention. The regular expression matching engine includes a regular expression compiling system and a regular expression matching system. The regular expression compiling system is connected to a system interface and receives a regular expression rule requiring matching inputted via the system interface. The regular expression rule includes a regular expression. The regular expression matching system is connected to a front-end module and receives data packets requiring matching. The regular expression matching system may also receive regular expression information which indicates a regular expression requiring matching.

The regular expression compiling system includes a syntax analyzing module, a category information library, a DFA compiling module, DFA transition tables, a PCRE compiling module and PCRE segments. The syntax analyzing module receives a user-inputted regular expression rule and analyzes the syntax of the regular expression in the regular expression rule and determines whether to send the regular expression to the DFA compiling module or the PCRE compiling module according to preset rules and the syntactic characteristics of the regular expression. The preset rules are particular rules for categorizing regular expressions, including rules set based on DFA syntactic characteristics and rules set based on PCRE syntactic characteristics. The syntax analyzing module generates a decision according to the above determining result and records the decision in the category information library. If the DFA compiling module receives the regular expression, the DFA compiling module compiles the regular expression into a DFA transition table and stores the DFA transition table; if the PCRE compiling module receives the regular expression, the PCRE compiling module compiles the regular expression into a PCRE segment and stores the PCRE segment.

A method for compiling a regular expression in an embodiment of the present invention includes as follows:

1. A user inputs a regular expression requiring matching to the matching engine via a system interface, such as a command line or an operating interface.

2. The syntax analyzing module receives the user-inputted regular expression, analyzes the syntax of the regular expression, and determines whether to send the regular expression to the DFA compiling module or the PCRE compiling module for compiling according to preset rules and the syntactic characteristics of the regular expression. The syntax analyzing module also generates a decision according to the above determining result and records the decision in the category information library.

3. If the DFA compiling module receives the regular expression, the DFA compiling module compiles the regular expression into a DFA transition table and stores the DFA transition table, where the DFA transition table is unnecessarily a primitive 2-dimensional transition table or transition chart. Considering other factors such as space efficiency, the DFA compiling module may compress the transition table and combine different DFAs. In this case, the transition table may be stored in another form which will not impact the essence of the present invention.

4. If the PCRE compiling module receives the regular expression, the PCRE compiling module compiles the regular expression into a PCRE segment and stores the PCRE segment. In actual software implementation, the form of a stored PCRE segment is related to the specific implementation and the difference in storage forms will not impact the essence of the present invention.

A regular expression matching system in an embodiment of the present invention includes a mediating module, a DFA adapter, a PCRE adapter and an integrated output module. The front-end module sends data packets and regular expression information (optional) requiring matching to the matching engine, where the data packets are common IP packets. For easy description, a module at the front end, including one or more modules, is expressed as a front-end module in FIG. 2. The front-end module may remove the layer 3 and layer 4 protocol headers from the original IP packets before sending the packets to the regular expression matching engine. The front-end module may also restructure the packets for the purpose of inter-packet regular expression inspection. If the integrated output module is required to sort and count the packets, the fed data packets need to contain a field that identifies the packets, for example, the sequence number of the original packet or a certain identifier allocated by the front-end module. Different packet formats will not impact the essence of the present invention. In FIG. 2, the identifier of the regular expression sent by the front-end module to the mediating module is mapped to the identifier set by the syntax analyzing module for the regular expression. The identifier indicates which regular expression is contained in the inputted data packets. The identifier is generated at the compiling stage and set by the front-end module according to its processing result and a certain mapping rule. The merit of doing so is that, when different regular expressions are described by different DFAs, the scope of regular expressions requiring matching will be narrower. If all regular expressions compiled by the DFA compiling module are compiled into one big DFA, the front-end module does not need to specify the identifier in a matching process. The variation of input parameters under different DFA implementations will not impact the essence of the present invention. The mediating module searches the category information associated with the regular expression. The category information may record whether the regular expression is compiled into a DFA or a PCRE. The mediating module queries the category information to determine which adapter will perform matching. The mediating module may determine the direction and sequence of data packets during the matching. For example, the mediating module determines the direction and sequence of data packets according to the direction and sequence information of data packets carried in the category information. The mediating module may let one DFA adapter or PCRE adapter perform matching or let multiple DFA adapters and/or PCRE adapters perform matching.

A method for matching a regular expression in an embodiment of the present invention includes as follows:

1. The front-end module sends data packets and regular expression information (optional) for matching to the matching engine.

2. The mediating module searches category information associated with the regular expression and determines which adapter will perform matching according to the search result. When the regular expression is compiled into a DFA transition table, the data packets are sent to the DFA adapter; when the regular expression is compiled into a PCRE segment, the data packets are sent to the PCRE adapter.

The DFA/PCRE adapter performs adapting/matching operation on the data packets and sends the adaptation/matching result (including at least matching success information or matching failure information) to the integrated output module uniformly. If multiple DFA/PCRE adapter threads adapt/match different data packets, the processing of earlier received packets may take more time than the processing of later received packets due to the different packet lengths and the complexity of regular expressions requiring matching. In this case, if the matching result is directly outputted to the subsequent service processing module, the matching result may be in a disordered sequence. If the sequence is significant, a cache may be placed in the integrated output module to sort the packet matching result. There are multiple sorting methods, for example, according to the sequence number of packets. Optionally, the integrated output module may make data statistics on the matching result. The statistic condition may be flexible, for example, top 10 regular expressions processed by the DFA adapter within the last 30 minutes. Different statistic conditions will not impact the essence of the present invention.

The integrated output module sends the matching result to the subsequent service processing module as the reference for subsequent actions of the service processing module. Optionally, the integrated output module may feed the statistics back to the syntax analyzing module for reference in the distribution of regular expressions for secondary compiling. For example, when it is detected that a certain regular expression is often processed by the DFA adapter recently, the syntax analyzing module may send the regular expression to the PCRE compiling module for secondary compiling. When the DFA adapter is busy, the mediating module may mediate the packets to the PCRE adapter for processing.

During a matching process, the mediating module may determine the direction and sequence of packets. For example, the mediating module determines the direction and sequence of packets according to the direction and sequence information of packets carried in the category information. The packets may be processed by one DFA adapter or PCRE adapter or by multiple DFA adapters and/or PCRE adapters. The linkage of adapters may be in one-channel, parallel and serial modes.

Figure 3:
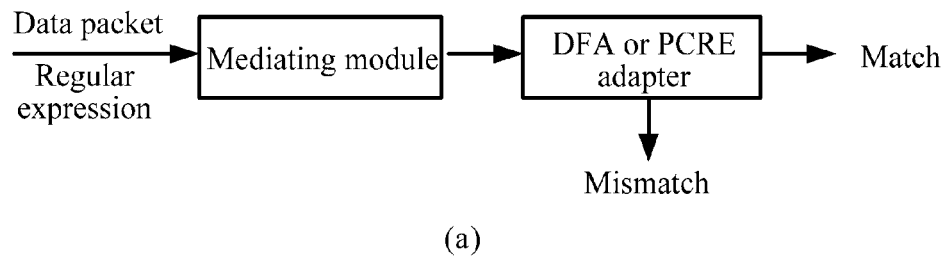
FIG. 3 shows a structure of a regular expression matching system with one-channel linkage according to an embodiment of the present invention.
Figure 3:
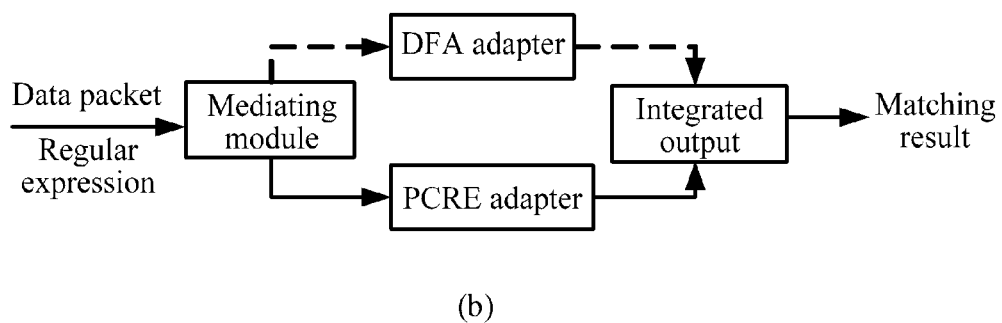

FIG. 3 shows the one-channel linkage, where the mediating module schedules packets to the DFA adapter or PCRE adapter for processing and data packets only flow to one adapter. For easy description, control plane modules are omitted in FIG. 3 (the integrated output module is also omitted in certain cases). As shown in FIG. 3(a), in most cases, one user-inputted regular expression rule includes only a certain regular expression which meets the syntactic characteristics of DFA or PCRE and the mediating module sends the packets to the DFA or PCRE adapter for processing. Another implementation is shown in FIG. 3(b). When a certain packet should be processed by the DFA adapter but the DFA adapter is busy while the PCRE adapter is idle, the mediating module sends the packet to the PCRE adapter for processing. In this case, the two adapters may be implemented by different devices. For example, the DFA adapter is implemented by a Field Programmable Gate Array (FPGA) and the PCRE adapter is implemented by a multi-core processor. Such processing facilitates the balance of loads and increases the throughput of the matching engine.

Figure 4:
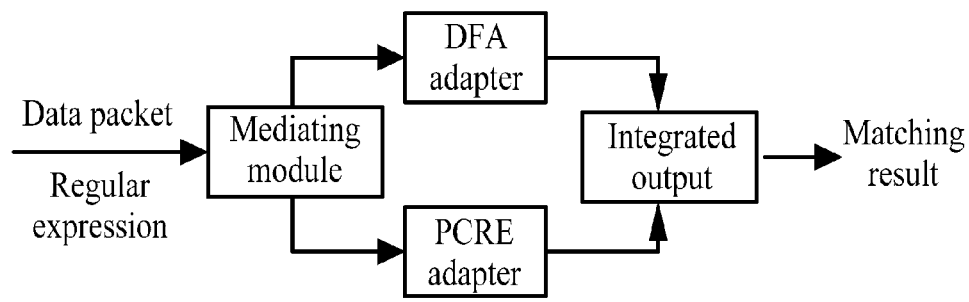
FIG. 4 shows a structure of a regular expression matching system with parallel linkage according to an embodiment of the present invention.

FIG. 4 shows the parallel linkage, which is similar to the one-channel mode shown in FIG. 3(b). The difference is that packets are distributed to different adapters for processing. Some user-inputted regular expression rules include multiple regular expressions, of which some are suitable for DFA processing and others can only be processed by PCRE. When a packet is to match such a rule, two adapters process the packet simultaneously. The merit of this mode is that the processing time of the regular expression matching engine is shortened.

Figure 5:
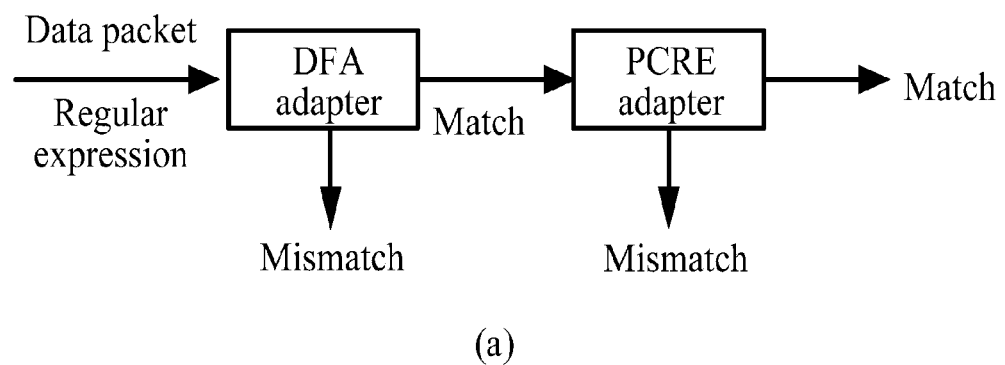
FIG. 5 shows a structure of a regular expression matching system with serial linkage according to an embodiment of the present invention.
Figure 5:
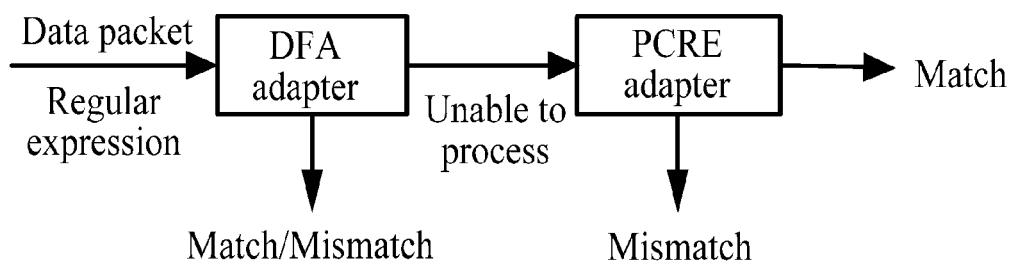

FIG. 5 shows the serial linkage, where the mediating module may exist independently and be linked before the DFA adapter; or a mediating module is unnecessary and data packets and regular expressions are first sent to the DFA adapter by default. This means the DFA adapter plays the role of a mediating module implicitly. As shown in FIG. 5(a), where one rule includes both a regular expression described in DFA mode and a regular expression described in PCRE mode, the DFA adapter may first filter packets that do not satisfy the regular expression in DFA mode to avoid unnecessary PCRE matching later. Or, as shown in FIG. 5(b), packets are sent to the DFA adapter by default. If the DFA adapter can match the packets according to the syntactic characteristics of the DFA, the DFA adapter performs the matching operation and outputs the matching result, or else the DFA adapter sends the packets to the PCRE adapter for processing. The merit of such processing is a simple modular structure without the need of an independent mediating module.

The regular expression compiling/matching systems and methods in the embodiments of the present invention are described by taking DFA and PCRE adapters as an example. The embodiments of the present invention are also applicable to scenarios where other matching methods, such as DFA and NFA, are used to process regular expressions. The scope of protection of the present invention is a system and method for matching regular expressions by using multiple matching algorithms and the algorithms in use are not limited. In the exemplary embodiments of the present invention, the regular expression compiling/matching systems and methods only include two compiling/matching modules but may be extended conveniently to more compiling/matching modules. The number of modules will not impact the essence of the present invention.

In the exemplary embodiments, only one DFA adapter and one PCRE adapter are described. In practice, the number of adapters is not limited. In fact, for optimal processing performance, multiple DFA adapters and multiple PCRE adapters are often used, for example, the use of multiple adapter threads. In this case, the mediating module may distribute packets according to the load condition of each thread. This will not impact the essence of the present invention.

In the exemplary embodiments of the present invention, the regular expression specification is PCRE but the methods of the present invention are also applicable to other possible regular expression specifications. The use of different regular expression specifications will not impact the essence of the present invention.

In the exemplary embodiments of the present invention, the regular expression compiling/matching systems and methods are specific to high-speed regular expression matching of data packets in a network environment. The systems and methods are also applicable to other possibly used regular expression specifications in such scenarios as search engine, database retrieval, natural language understanding, and document classification and the matching objects are not limited to packets. For example, in the case of database retrieval, the matching objects are data entries in data tables.

The matching system in the embodiments of the present invention may be implemented in different devices or one device; it may be implemented by hardware or software, or even different functions within one software unit. Therefore, the implementation of the present invention is flexible but the difference in implementation will not impact the essence of the present invention.

The regular expression compiling/matching systems and methods in the embodiments of the present invention consider characteristics of regular expressions and support PCRE regular expressions in a real sense so as to help reduce the cost of storage components in a device. When regular expressions are compiled, if the regular expression set does not change often, all regular expressions may be compiled into one DFA to save storage space; if the regular expression set changes often, different regular expressions may be compiled into different DFAs so that it is unnecessary to recompile the entire DFA when individual regular expressions are updated. This will save the time of compiling. In whichever case, because the syntax analyzing module has sent regular expressions with a large number of states to the PCRE compiler for processing, the storage space is saved. The systems and methods in the embodiments of the present invention provide full support for PCRE-like regular expression specifications while assuring high-speed packet processing for network devices.

The benefits of the present invention include a high processing speed on the condition of full support for PCRE regular expression syntaxes and the ability to adjust processing behaviors of the engine according to real-time traffic and achieve a higher system throughput. The embodiments of the present invention are applicable to all fields where regular expressions are possibly used, including data packet processing, search engine, database retrieval, natural language understanding, and document classification.

The preceding embodiments of the present invention are exemplary only and are not intended to limit the present invention. Any modification, equivalent substitution, and improvement without departing from the principle of the present invention should be covered in the scope of protection of the present invention.

What is claimed is:

1. A regular expression matching system, configured to match a received data packet by communicating with a regular expression compiling system, the regular expression compiling system comprising:
   at least one processor;
   a syntax analyzing module configured to analyze syntactic characteristics of a regular expression and send the regular expression to an appropriate compiler of at least two types of compilers according to preset syntactic rules and the syntactic characteristics of the regular expression; and
   the at least two types of compilers configured to receive the regular expression and compile the regular expression into a data structure of a specific form according to preset rules; and
   a category information library, wherein decision information generated by the syntax analyzing module is recorded in the category information library;
   wherein the regular expression matching system comprises:
      at least two types of matching modules, configured to match the received data packet according to the syntactic characteristics of the regular expression which the data packet is matched with and is compiled into the data structure of the specific form by the regular expression compiling system, wherein the at least two types of matching modules comprise a Deterministic Finite Automaton (DFA) adapter and a Perl Compatible Regular Expression (PCRE) adapter; and
      a mediating module, configured to search category information in the category information library using the generated decision information associated with the regular expression to determine which adapter will perform matching according to a search result;
      wherein, when the regular expression is compiled into a DFA transition table, the regular expression is sent to the DFA adapter;
      when the regular expression is compiled into a PCRE segment, the regular expression is sent to the PCRE adapter.

2. The system of claim 1, further comprising the mediating module configured to determine a processing sequence of the data packet by the at least two types of matching modules according to a preset rule, wherein inter-module linkage modes between the at least two types of matching modules comprise one-channel linkage, parallel linkage and serial linkage.

3. The system of claim 1, further comprising an integrated output module, connected to the matching modules and configured to receive matching results outputted by the at least two types of matching modules; wherein the integrated output module comprises a cache configured to sort packet matching results.

4. The system of claim 3, wherein the integrated output module makes data statistics on the matching results, and feeds the data statistics back to the syntax analyzing module; and
   the syntax analyzing module updates the preset syntactic rules according to the data statistics and initiates a second compiling process.

5. A regular expression matching method, comprising:
   receiving, by a regular expression matching engine, a data packet requiring matching from a front-end module;
   searching, by a mediating module in the matching engine, a category information library for category information associated with a regular expression using a decision information for determining which adapter will perform matching according to a search result;
   wherein, when the regular expression is compiled into a Deterministic Finite Automation (DFA) transition table the regular expression is sent to a DFA adapter;
   when the regular expression is compiled into a Perl Compatible Regular Expression (PCRE) segment, the regular expression is sent to a PCRE adapter; and
   matching, by the DFA adapter or the PCRE adapter which is determined by the mediating module, the data packet according to syntactic characteristics of the regular expressions which the data packet is matched with and is compiled into a data structure of a specific form by a regular expression compiling method;
   wherein the regular expression compiling method comprising:
      receiving a user-inputted regular expression rule which includes the regular expression and analyzing the syntax characteristics of the regular expression to generate the decision information and record in the category information library; and
      sending the regular expression to an appropriate compiler of at least two types of compilers according to preset syntactic rules and the syntactic characteristics of the regular expression to compile the regular expression into the data structure of the specific form by the appropriate compiler according to preset rules.

6. The method of claim 5, further comprising: determining a processing sequence of the data packet by the DFA adapter and the PCRE adapter according to a preset rule, wherein linkage modes of the DFA adapter and the PCRE adapter comprise one-channel linkage, parallel linkage and serial linkage.

7. The method of claim 6, wherein the DFA adapter and the PCRE adapter send matching results uniformly to an integrated output module; the integrated output module comprises a cache configured to sort packet matching results.

8. The method of claim 7, wherein the integrated output module makes data statistics on the matching results, and feeds the data statistics back to a syntax analyzing module; and the syntax analyzing module updates the preset syntactic rules according to the data statistics and initiates a second compiling process.

* * * * *